United States Patent
Shumack et al.

(10) Patent No.: US 7,275,670 B1
(45) Date of Patent: Oct. 2, 2007

(54) HITCH MOUNTED REMOVABLE DOOR CARRIER

(76) Inventors: Brian Lee Shumack, 2161 Lawrence Cir., Rocky Mount, NC (US) 27804; Irving Lee King, 3305 Woodlawn Rd., Rocky Mount, NC (US) 27804

(*) Notice: Subject to any disclaimer, the term of this patent is extended or adjusted under 35 U.S.C. 154(b) by 521 days.

(21) Appl. No.: 10/826,000

(22) Filed: Apr. 19, 2004

(51) Int. Cl.
*B60R 11/00* (2006.01)
(52) U.S. Cl. ...................................... 224/518
(58) Field of Classification Search .............. 224/519, 224/521, 518, 502, 525, 509, 531
See application file for complete search history.

(56) References Cited

U.S. PATENT DOCUMENTS

| | | | |
|---|---|---|---|
| 3,268,131 A * | 8/1966 | Benton | 224/324 |
| 4,561,575 A * | 12/1985 | Jones | 224/521 |
| 6,811,038 B1 * | 11/2004 | Sanderson | 211/13.1 |
| 6,889,881 B2 * | 5/2005 | Wilkens | 224/509 |

* cited by examiner

*Primary Examiner*—Nathan J. Newhouse
*Assistant Examiner*—Margaret Olson
(74) *Attorney, Agent, or Firm*—Ishman Law Firm P.C.

(57) ABSTRACT

A door carrier for transporting the removable side doors of a Jeep-type vehicle includes a base frame coupled to a rear hitch on the vehicle having side frame assemblies provided with hinge and latch members for carrying and latching the side doors at mountings replicating the vehicle door mounting. The base frame and side frame assemblies include pivotal connections for permitting vertically folded storage adjacent the rear of the vehicle.

13 Claims, 9 Drawing Sheets

HITCH MOUNTED REMOVABLE DOOR CARRIER

FIELD OF THE INVENTION

The present invention relates to a storage device for removable vehicle doors, and, in particular, to a vehicle hitch mounted carrier for transporting the doors of JEEP-type vehicles.

BACKGROUND OF THE INVENTION

The classic JEEP vehicle continues to be a popular leisure and recreational transportation. Characterized by a retractable top and removable doors, the vehicle provides an open-air ambience in urban, rural and off-road settings. While the top may be conveniently stowed, the removable doors pose a greater storage problem. They may be inconveniently stored at the residence or garage and subject to inadvertent damage. Such off-site is also a problem if inclement weather is encountered or the vehicle is parked where security is an issue. Alternatively, the doors may be stored on board for use as needs arise, but at a sacrifice to passenger capacity and cargo space. Moreover, in the vehicle, the doors are unsecured and subject to damage.

Accordingly, it would be desirable to provide a safe and secure storage of the vehicle on-site for ready reinstallation as desired without sacrificing passenger comfort or cargo capacity.

SUMMARY OF THE INVENTION

The present invention hitch mounted carrier for removable JEEP vehicle doors on which the doors may be stowed and latched. The carrier includes a base frame that is pivotally mounted on the hitch moveable between a vertical raised stowed position adjacent the spare wheel during periods of non-use and a horizontal lowered position. The frame includes a pair of folding side arm assemblies having mountings replicating the vehicle door frame. The arm assemblies include sets of hinge sleeves for receiving the door hinge pins and an opposed lock pins for engagement with the door latch mechanisms in replication of the mountings on the vehicle. Stored on the carriers, the doors are securely mounted without reducing passenger or cargo space. For replacement on the vehicle, the doors are conventionally unlatched, lifted from the side arm assemblies and reinstalled. The carrier may then be folded to the stowed position on the vehicle or removed for compact storage at the residence. The frame may also be utilized for carrying other cargo such as coolers, recreational equipment and the like.

Accordingly, it is an object of the invention to provide a carrier for removable vehicle doors that does not reduce passenger or cargo capacity of the vehicle.

Another object of the invention to provide a hitch mounted carrier for Jeep type vehicle removable doors.

A further object of the invention is to provide a carrier for removable vehicle doors at a mounting replicating vehicle mounting thereof.

Yet another object of the invention is to provide a folding carrier for Jeep-type removable doors that may be readily converted from a compact stowed position to an operative carrying position for transporting.

DESCRIPTION OF THE DRAWINGS

The above and other objects and advantages of the present invention will become apparent upon reading the following detailed description taken in conjunction with the accompanying drawings in which.

DETAILED DESCRIPTION OF THE PREFERRED EMBODIMENTS

Figure 1:
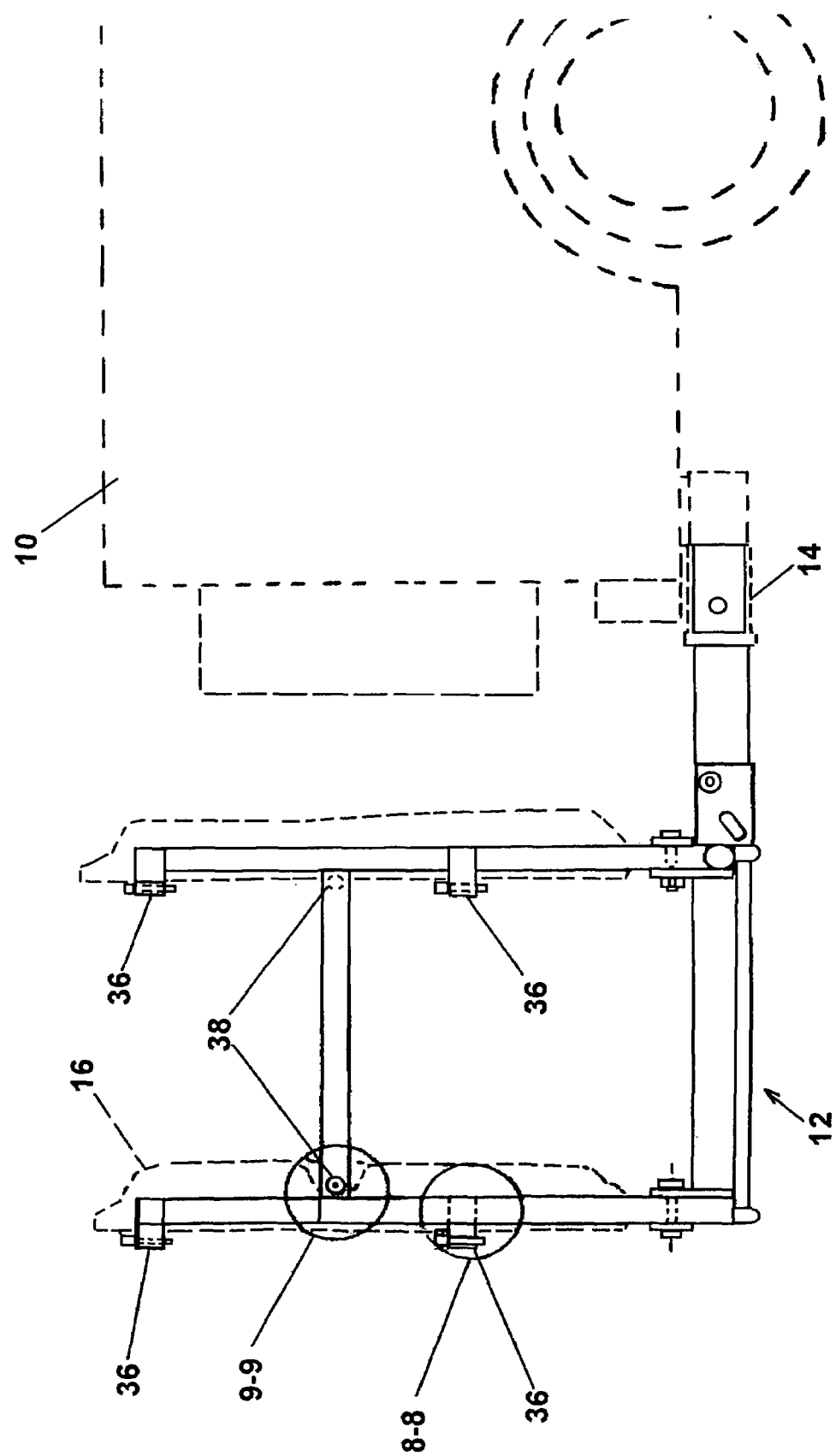
FIG. 1 is a side view of a door carrier according to a preferred embodiment of the invention mounted on a vehicle hitch of a Jeep-type vehicle and showing the doors carried thereon in dashed lines.
Figure 6:
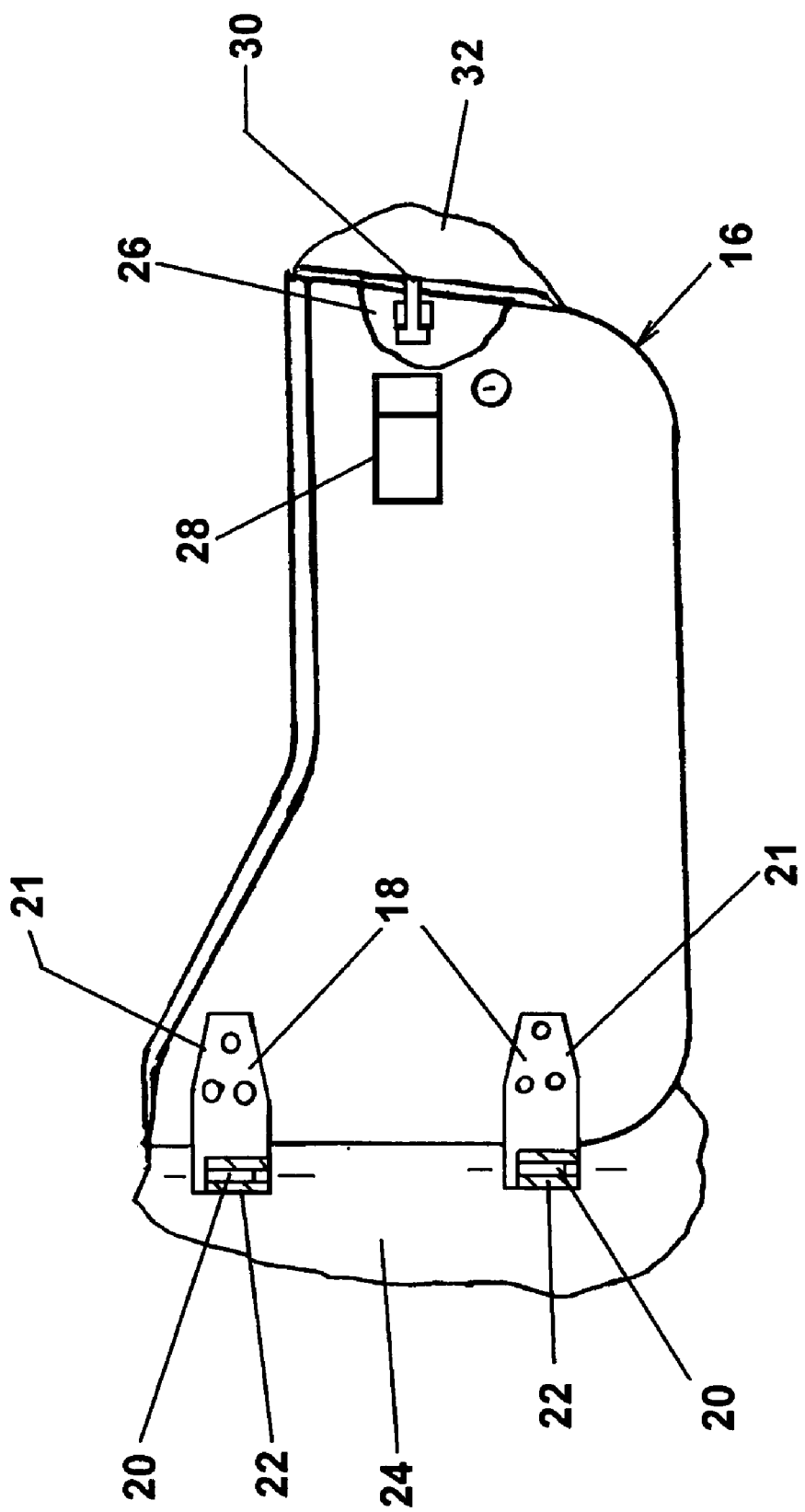
FIG. 6 is a fragmentary side view of the door mounted on the vehicle.

Referring to the drawings, FIG. 1 illustrates JEEP-type vehicle 10 having a door carrier 12 mounted at a conventional rearwardly extending REESE-type a hitch 14. As shown in FIG. 11, a typical vehicle 10 is provided with a pair of removable side doors 16 mounted a vertically spaced door hinge set 18. As shown in FIG. 6, the doors 16 of such vehicles are characterized by a pair of downwardly projecting circular hinge pins 20 carried on exterior door mounted brackets 21. The hinge pins 20 are journaled in hinge sleeves 22 mounted at the front vehicle door frame 24. The doors 16 also include a door latch mechanism 26 operated by exterior and interior handles 28. The latch mechanism 26 releasably engages a transverse cylindrical lock pin 30 projecting forwardly from the rear door frame 32 for locking and unlocking the door.

In such vehicles, the doors 16 may be removed from the vehicle by operating the handle 28 to unlatch the mechanism 26, opening the door, and thereafter vertically raising the door to remove the hinge pins 20 from the sleeves 22. After removal, as shown in FIG. 1, the doors 16 may be mounted on the carrier 12 as indicated by the dashed lines in FIG. 1 and thereat captively held by hinge brackets 36 and latch pins 38 replicating the vehicle door mounting. The vertical spacing and locations of the hinge pins and latching mechanisms for Jeep-type doors has remained consistent over an extended period of time permitting the invention to be utilized by a wide range of new and used vehicles.

Referring to FIGS. 2 through 5, the carrier 12 includes a base frame 40 and a pair of laterally spaced pivoting side frames 42. The base frame 40 is connected at a front pivot assembly 44 to a mounting tube 46 for pivotal movement about a transverse horizontal axis 47. The mounting tube 46 has a front end that is conventionally telescopically received within the receiver 48 of the hitch 14 and conventionally secured thereto by a cross pin 49.

Figure 7:
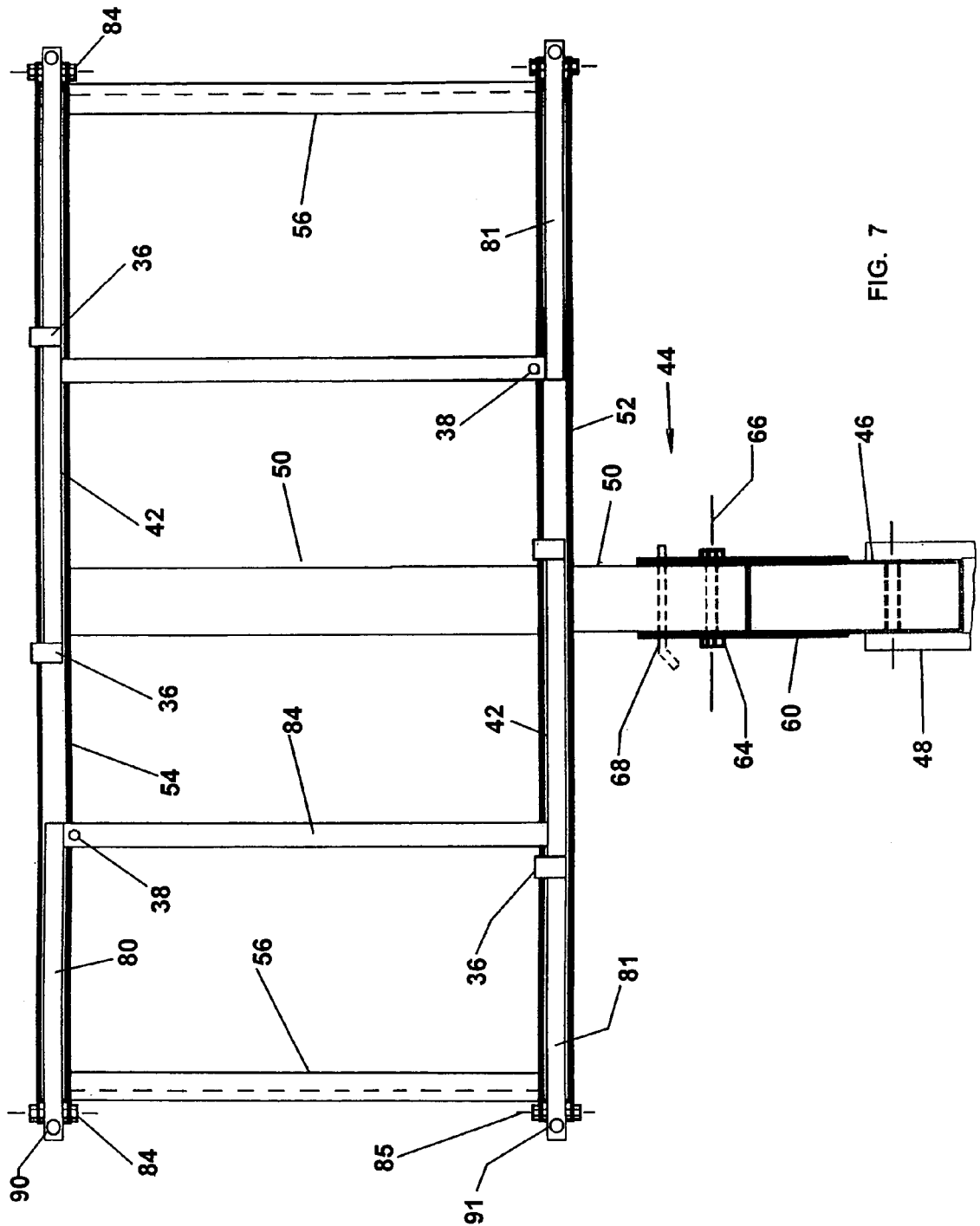
FIG. 7 is a top view of the door carried in the lowered position with the side arms folded.

Referring additionally to FIG. 7, the base frame 40 includes a center strut 50 having a transverse front rail 52 attached to a top surface adjacent the front pivot assembly 44 and a longitudinally spaced transverse rear rail 54 attached to the top surface at the rearward end thereof. Preferably, the center strut is an elongated metallic tube and the rails 52, 54 are elongated metallic angles. The rails 52, 54 are fixedly attached to the strut 50 by welding or mechanical fastening. The ends of the rails 52, 54 are interconnected by side rails 56. As shown most clearly in FIG. 5, V-shaped lateral reinforcing straps 58 are connected at ends to the outer portions of the rails at the center to the bottom surface of the strut 50.

Figure 2:
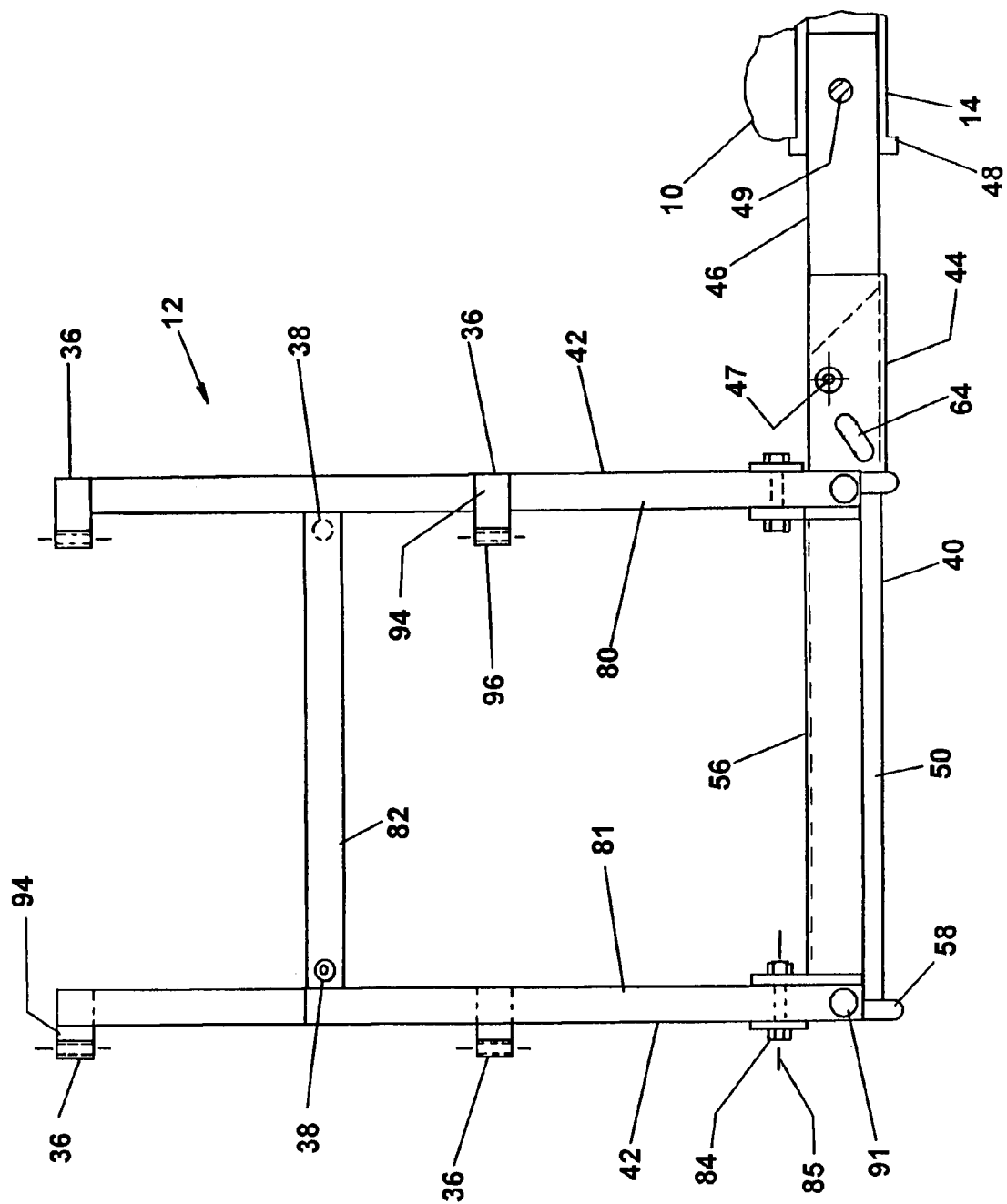
FIG. 2 is a side view of the door carrier in the deployed door carrying position.
Figure 3:
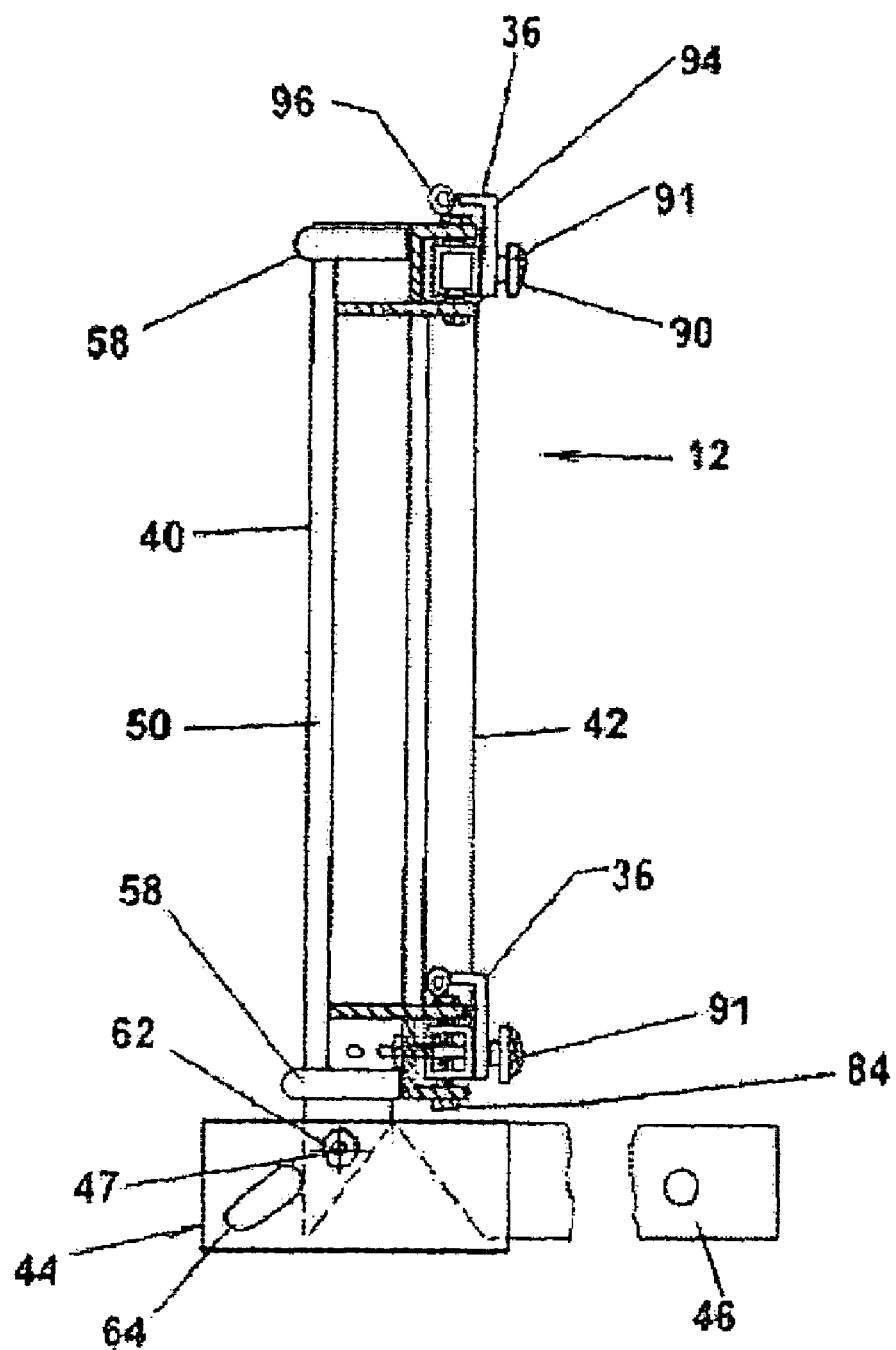
FIG. 3 is a side view of the door carrier in the stowed position.
Figure 4:
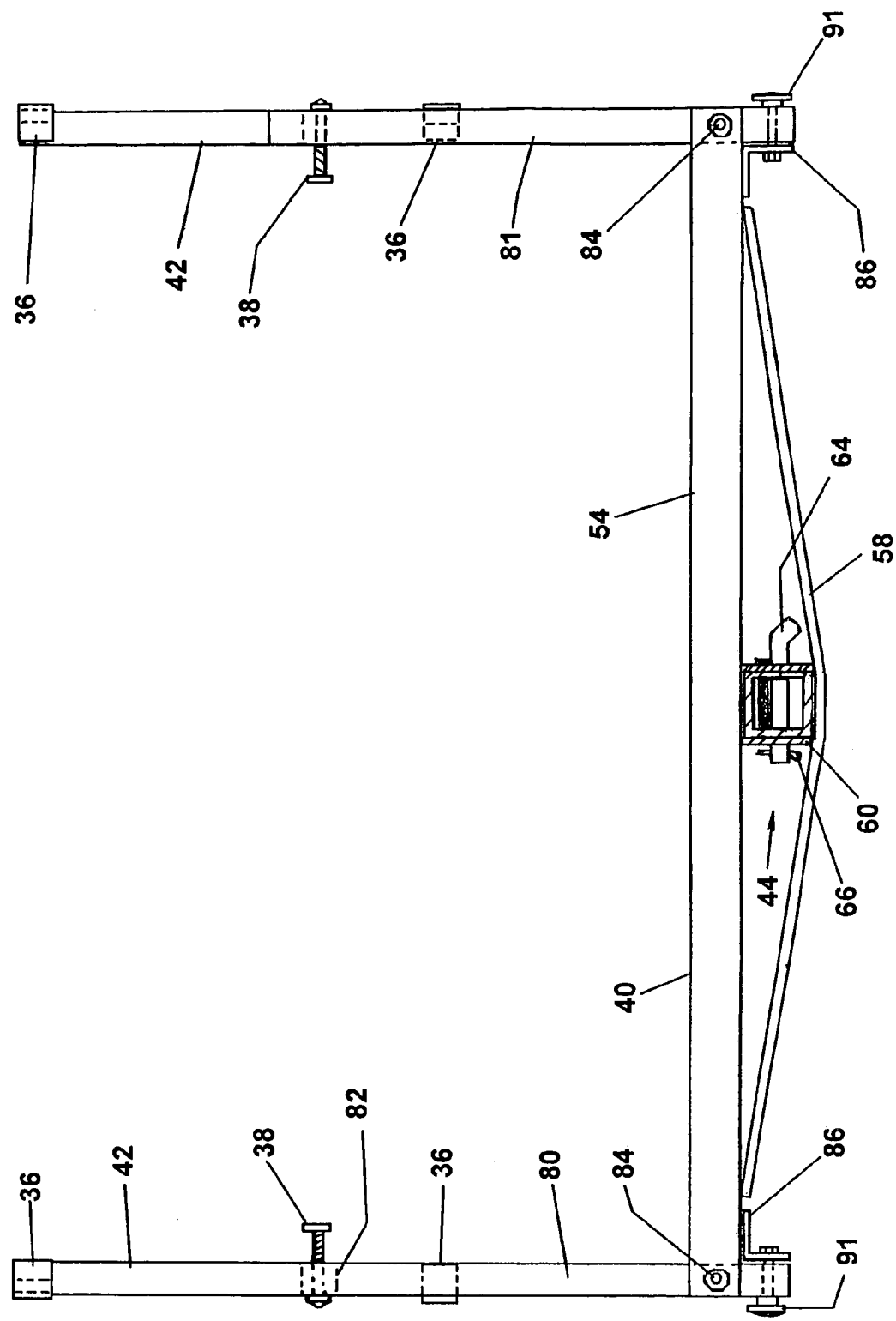
FIG. 4 is an end view of the door carrier in the deployed door carrying position.

The front pivot assembly 44 pivotally interconnects the center strut and the mounting tube for movement between a horizontal lowered position shown in FIG. 2 and a vertical raised position shown in FIG. 3. The rear end of the mounting tube 46 is beveled as shown in FIG. 3. A pair of rectangular hinge plates 60 are welded to the sides of the mounting tube 46. The center strut 50 includes a beveled front end that engages the rear end of the mounting tube 46 in the horizontal position. A pivot pin assembly 62 connects the center strut 50 to the hinge plates 60 for rotation about axis 47. A locking pin 64 extends through aligned apertures in the plates 60 and the strut 50 to lock the frame in the horizontal position. The pin 64 is maintained a removable cotter pin 66 (FIG. 4). In the raised position, the pin 64 extends through the plate apertures and engages the bottom surface of the strut 50 to maintain the raised vertical position.

Each side frame 42 includes a pair of spaced legs 80 interconnected by cross bar 82. The lower ends of the legs 80 are received in the rails 52, 54 and pivotally connected to the side walls thereof by pivot connections 84 for movement about a longitudinal axis between a vertical raised position and a lower horizontal stowed position nesting in the rails. End angles 86 are attached across the ends of the rails 52, 54. A threaded fastener 90 including knob 91 extends through a cross hole at the lower end of the leg 80 and is threaded into a threaded nut 92 carried on the lower leg of the angle 86 to maintain the side frames 42 in the vertical position. The fastener 90 is unthreaded from the nut 92 to permit rotation to the lowered nested position (FIGS. 5 and 7).

The hinge brackets 36 are attached in vertically spaced pairs to one leg of each side frame. The vertical spacing is substantially the same as the spacing between the hinge pins 20 on the doors 16. The latch pin 38 is attached to the cross bar on the legs and projects inwardly toward the opposed hinge bracket set. The lateral spacing between the brackets 36 and the latch 38 is substantially the same as the spacing on the vehicle frame.

Figure 8:
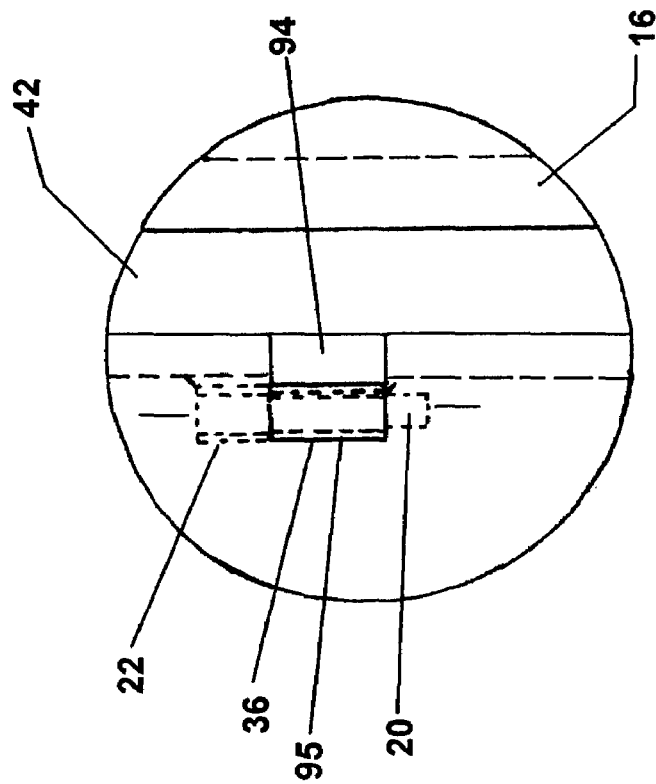
FIG. 8 is an enlarged view of the door hinge mounting on the door carrier taken in circle 8-8 of FIG. 1.
Figure 9:
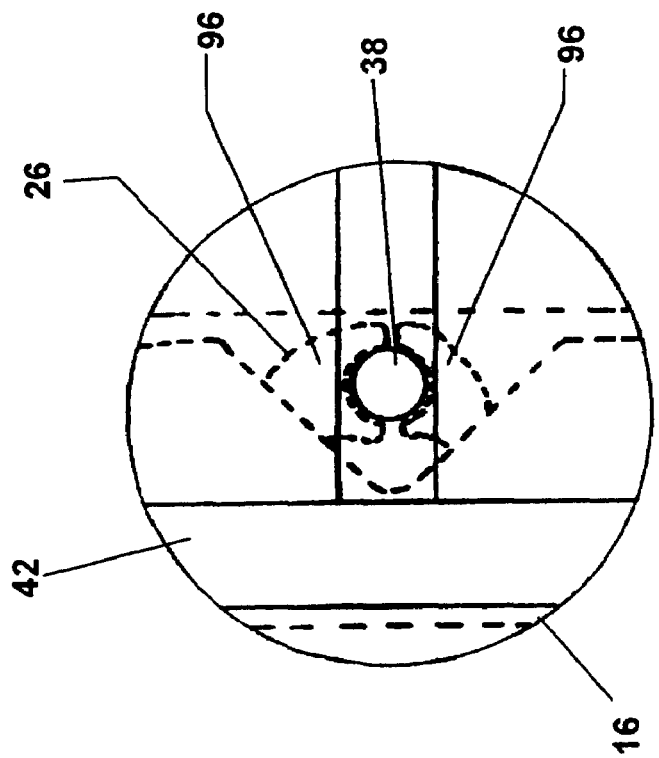
FIG. 9 is an enlarged view of the door latch mounting on the door carrier taken in circle 9-9 of FIG. 1.
Figure 10:
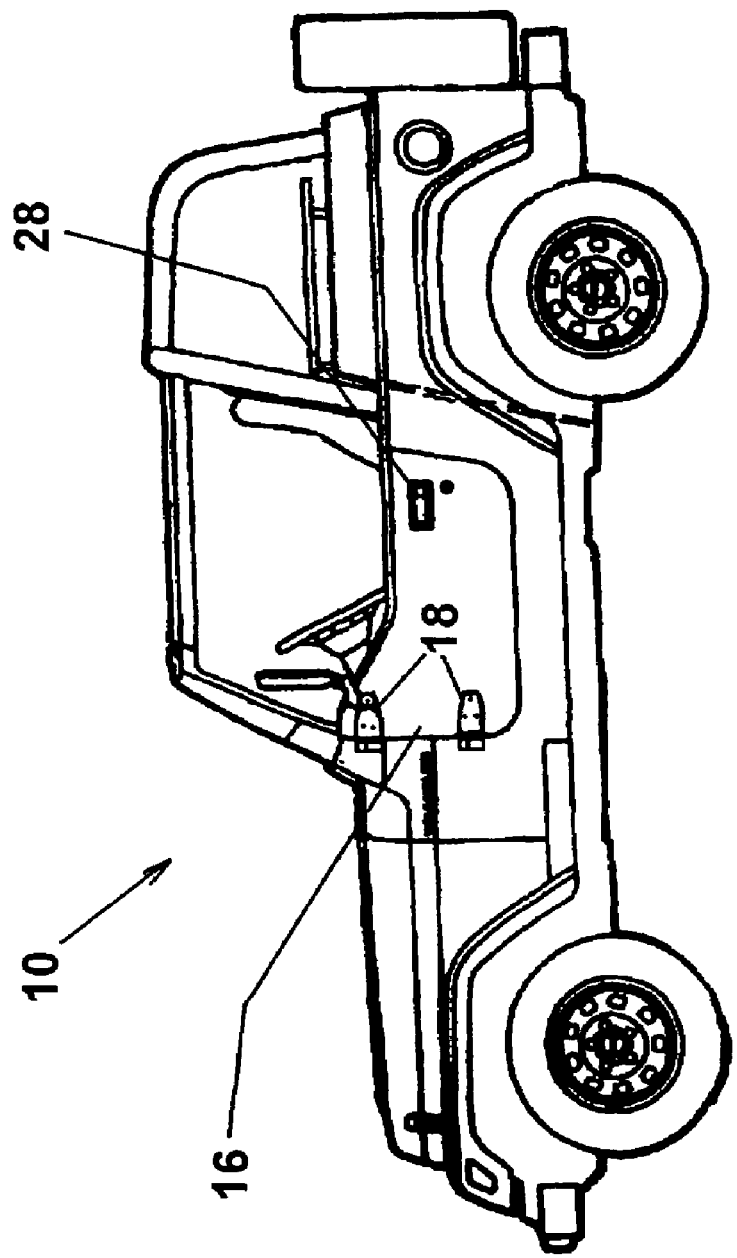
FIG. 10 is a prior art view of Jeep type vehicle provided with removable doors for transport on the door carrier.

As shown in FIGS. 2 and 8, the hinge brackets 36 include a mounting plate 94 attached to the inner surface of the associated leg and a support sleeve 95 having a vertical passage for slidably accommodating the hinge pin of the door. As additionally shown in FIG. 9, the cross bar 82 and the latch pin 38 are vertically located to register with and engage the keepers 96 of the latching mechanism of the door.

Figure 5:
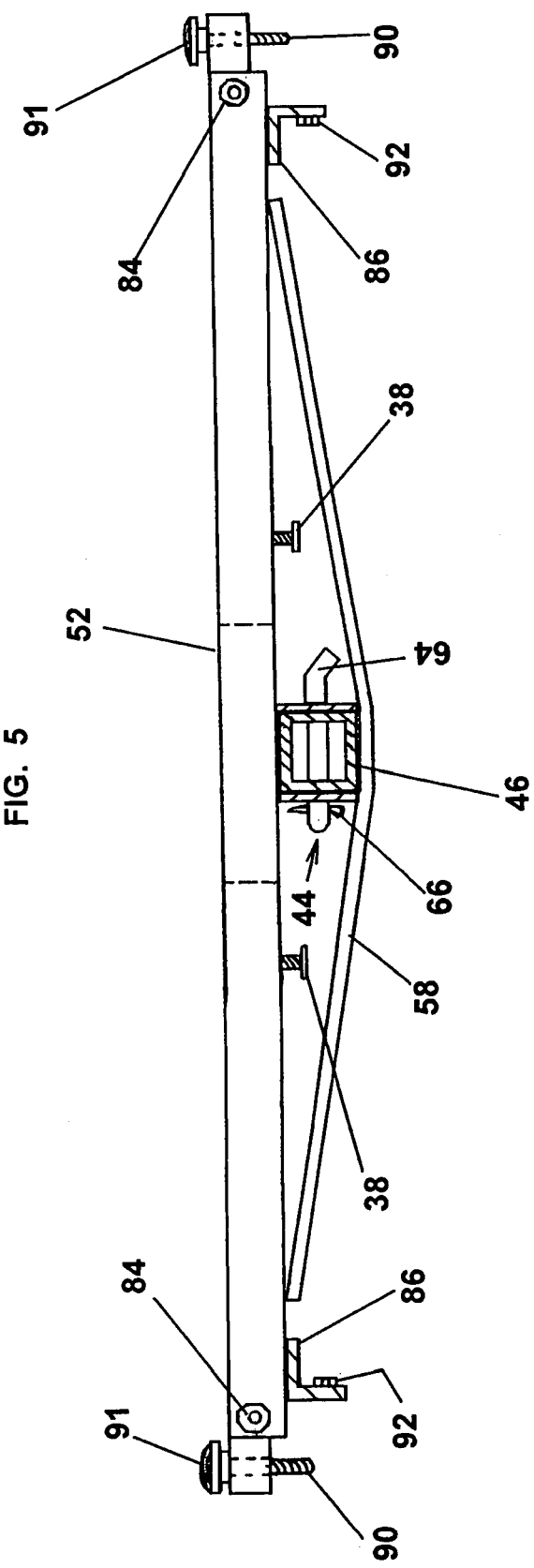
FIG. 5 is an end view of the door carrier with the side frames in the folded position.

In use, the carrier 12 is preferably mounted in the fully folded condition shown in FIG. 5. For assembly, the mounting tube 46 is telescoped into the hitch receiver 48 and latched by a conventional cross pin 49. For deployment in the door carrying mode, the pin 63 is removed from pivot assembly 44 and the frame 40 pivoted about the horizontal transverse axis 47 of the pivot assembly to the horizontal position shown in FIGS. 2 and 3. The pin is then reinserted through the aligned apertures to lock the frame. The side frames 42 are then pivoted about the horizontal longitudinal axes 85 of the hinge assemblies to the raised positions shown in FIGS. 4 and 5 and locked in place by threading the fasteners 90 into the nuts 92.

For the illustrated bracket orientations, the passenger side door is first removed from the vehicle and the hinge pins 20 thereof inserted into the sleeves on the front hinge brackets with the door pivoted rearwardly. The door is then pivoted against the latch pin 38 causing the keepers 96 of the latch mechanism 26 to assume a locked condition therewith, thereby captively mounting the passenger door on the carrier. The door lock may be latched to further secure the door on the carrier. The driver side door is mounted at the rear position in a similar manner. The doors are removed for use on the vehicle by reverse methodology. The side arms are then folded down, and the base frame pivoted upwardly and locked. The vehicle may operate in the folded position with minimal rearward projection. Alternatively, the carrier may be removed and stowed in the vehicle cargo bed or moved to a separate storage location.

The door carrier may be also secondarily employed as a carrier for other recreational cargo such a coolers, suitcases, and other cargo thereby making available the vehicle freely available for front and rear seat passengers.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed:

1. In a vehicle characterized by a pair of removable side doors operatively carried on a vehicle at a door mounting having pairs of vertically spaced hinge brackets for receiving the hinge pins of the removable side doors and lock pins for latching engagement with a door latching mechanism on the side door and wherein said vehicle is provided with a trailer hitch having a longitudinally rearwardly opening receiver, a door carrier for transporting the side doors on the vehicle after removal from the door mountings, said door carrier comprising: a mounting member having a front end for telescopic insertion and operative retention into said receiver; a base frame member pivotally connected to said mounting member about a transverse horizontal axis and moveable between a vertical raised position and a horizontal lowered position; a pair of side frame members pivotally connected in laterally spaced relationship to said frame member for movement at said lowered position about longitudinal horizontal axes between a horizontal position overlying said base frame member and a vertical position normal thereto; a first set of mounting members at a front portion of said side frame members replicating said door mounting of the vehicle for one of said side doors including pin receiving members for the hinge pins of said one of said pair of side doors on one of said side frame members and a door lock member on the other of said side frame members for operative engagement with the latching mechanism thereof; a second set of mounting members at a rear portion of said side frame members replicating said door mounting of the vehicle for the other of said side doors including pin receiving members for the hinge pins of said other of said pair of side doors on said other of said side frame members and a door lock member on said one of said side frame members for operative engagement with the latching mechanism, whereby said side doors may be removed from the vehicle and carried in spaced relation on said sets of mounting members replicating the door mountings on the vehicle.

2. The door carrier as recited in claim 1 including means cooperating between said base frame member and said side frame members for locking said side frame members in said vertical position.

3. The door carrier as recited in claim 2 including means cooperating between said base frame member and said mounting member for selectively locking said base frame member in said horizontal position and said vertical position.

4. The door carrier as recited in claim 1 wherein said side frame members each include a pair of longitudinally spaced arms pivotally connected at lower ends to said base frame member and interconnected by a cross member, one of said arms including said pin receiving members for one of said side doors and the cross member carrying said door lock members for the other of said side doors.

5. The door carrier as recited in claim 4 wherein said sets of mounting members are disposed to carry said side doors with the exteriors facing rearwardly.

6. The door carrier as recited in claim 4 wherein said base frame member includes a center support member and a pair of longitudinally spaced transverse cross members attached to said center support member and said arms are pivotally connected at the outer ends of said cross members.

7. A door carrier for removable doors of a vehicle wherein the doors include a pair of vertically spaced downwardly extending pin members and a longitudinally spaced latching mechanism, said door carrier comprising: a frame member, said frame member having a mounting member for attachment into a vehicle trailer hitch, said frame member having laterally spaced vertically extending side frame assemblies provided with sets of mounting sleeves for receiving said pin members of said doors and a latching member for engagement with said latching mechanism of said doors, the arrangement of said sets being such that said doors may be carried thereon in longitudinally spaced relation.

8. The door carrier as recited in claim 7 wherein said side frame assemblies are inwardly pivotal into overlying relation with said frame member.

9. The door carrier as recited in claim 8 wherein said frame member is pivotally connected to said vehicle for pivotal movement between a lowered position for carrying said doors and a raised position adjacent the rear of said vehicle.

10. The door carrier as recited in claim 7 wherein said attachment with said vehicle includes a hitch receiver on said vehicle and a forwardly projecting support member on said frame member for releasable coupling therewith.

11. The door carrier as recited in claim 10 wherein each of said sets includes a pair of brackets attached in vertically spaced relation on said side frame assemblies and an inwardly projecting cylindrical lock pins operatively engagable by said latching mechanism.

12. A method of transporting a removable door on a vehicle wherein said door includes a door panel having a pair of vertically spaced hinge pins at one side and a latch mechanism actuated by a pin at another side and wherein said vehicle has a trailer hitch at a rear end, said method comprising: providing a frame member including a connecting member for removable mounting at the trailer hitch; providing a first pair of sleeve members on said frame member for receiving said hinge pins at a mounting position; and providing a first pin on said frame member for actuating said latch mechanism at said mounting position.

13. The method as recited in claim 12 including providing said frame member with a second pair of sleeve members and a second pin for carrying another door of the vehicle.

* * * * *